(12) United States Patent
Smith

(10) Patent No.: US 6,854,028 B2
(45) Date of Patent: Feb. 8, 2005

(54) DISK DRIVE CONTROL FOR IMPROVING THE OPERATION OF A COMPUTER SUBJECTED TO MOTION

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 09/821,595

(22) Filed: Mar. 29, 2001

(65) Prior Publication Data

US 2002/0144034 A1 Oct. 3, 2002

(51) Int. Cl.$^7$ .............................................. G06F 13/00
(52) U.S. Cl. ........................................ 710/100; 711/111
(58) Field of Search ..................... 710/100, 6; 711/111, 711/112; 361/685; 360/75, 97.02; 369/53.1; 257/414; 425/135; 340/540; 248/638

(56) References Cited

U.S. PATENT DOCUMENTS

| | | | | |
|---|---|---|---|---|
| 5,145,693 A | * | 9/1992 | Hinzpeter et al. | 425/149 |
| 5,675,321 A | * | 10/1997 | McBride | 340/568.2 |
| 6,021,041 A | * | 2/2000 | Genix et al. | 361/685 |
| 6,065,094 A | * | 5/2000 | Akiyama | 711/112 |
| 6,101,062 A | * | 8/2000 | Jen et al. | 360/75 |
| 6,262,463 B1 | * | 7/2001 | Miu et al. | 257/414 |

* cited by examiner

Primary Examiner—Gopal C. Ray
(74) Attorney, Agent, or Firm—Wood, Herron & Evans, L.L.P.

(57) ABSTRACT

An apparatus, method and program product are operable for controlling the operation of a disk drive in a computer subjected to motion, and comprise monitoring the motion of the computer and detecting multiple successive forces on the computer caused by the motion. Based upon characteristics of the detected forces, a motion condition, such as a walk or non-walk condition is determined. Disk drive operations are then scheduled based on the motion condition so that the scheduled disk drive operations significantly avoid occurrence during one of the future motion forces and accelerations.

46 Claims, 4 Drawing Sheets

DISK DRIVE CONTROL FOR IMPROVING THE OPERATION OF A COMPUTER SUBJECTED TO MOTION

FIELD OF THE INVENTION

This invention relates generally to computers, and more specifically to a disk drive control for improving the operation of computers which are subjected to motion, such as computers which are wearable on the body of a user.

BACKGROUND OF THE INVENTION

As personal computers have become more popular in everyday life, they have also become more indispensable in the daily activities of a computer user. As such, many computer users desire almost constant access to their computers. As technology and communications advance and more goods and services are available through the use of a computer, such as over the Internet, the desire for constant access will continue to increase among computer users.

Conventionally, computers utilized by individuals and businesses are stand-alone devices which are generally permanently placed on a desk top, table top, or other support surface. While they may be readily moved from place to place, they are not meant to be constantly carried around by the user. To address the need for portability, portable computers are available which are carried by the user, generally in a specially made suitcase or bag. Existing portable computers continue to decrease in size and weight, but are still designed to be carried like luggage in a separate bag or other container and are then used by placing them on an available flat surface, such as a desk top.

Recently, wearable computers have become available. Wearable computers, such as a wearable personal computer, are worn or carried, and also used, on the body of the user. Therefore, the wearable computer is usually carried around without having to be stowed in a bag and hand-carried like luggage. Furthermore, a wearable computer is more likely to be used while being worn, rather than being taken off and placed on a support surface. This arrangement provides the user with greater mobility, convenience, and flexibility in the use of their computer.

As may be appreciated, a wearable computer that is worn or supported on the body of a user is thus going to be exposed to the movements of the user's body and the forces generated by such movements. Usually such forces will be predominantly those forces and accelerations encountered by the body during locomotion, such as walking and running. Such forces may be considerable, particularly if the user is running while wearing the computer. For example, an average person running will generate a ground reaction force which is around 2.4 times the person's body weight. This may result in an average acceleration of about 2 G or greater on the body and computer, and peak accelerations will frequently exceed that value. These forces, which a wearable computer must handle, can cause problems in the operation of the computer and degrade its performance.

Specifically, various electromechanical devices utilized in a computer, most notably the disk drive, are sensitive to the shock and vibration caused by motion forces. The heads of the disk drive, which are precisely positioned and aligned over selected tracks on a disk, are particularly sensitive to misalignment due to such shock and vibration. This causes operational errors, such as read errors and/or write inhibits. The orientation of a disk drive in a wearable computer only exacerbates the problem. The thinnest dimension in a computer is the plane of rotation of the disks and the head actuator. Since the wearable computer must be kept thin, the worst case accelerations and forces caused by motion, such as walking, jogging, or running, will be in the rotational plane of the disk drive.

Disk drive operations are severely impacted during use due to the accelerations of the user's motion which are rotational and y-axis (i.e., in the direction of the actuator) and which exceed 2 Gs. Such forces tend to cause servo tracking errors and the resulting read errors and write inhibits. The forces from such motion and accelerations actually act on the actuator arm, causing the heads of the drive to move off track. Typical track densities are over 30,000 tracks per inch in miniature (1") disk drives. Therefore, It may be readily appreciated that a vibration sufficient to cause 2 G acceleration will displace the heads from the desired task sufficiently to cause a write inhibit or other errors, such as read errors.

The operation of the disk drive is critical to the overall performance of any computer, including a wearable computer. Therefore, the motion forces encountered by a wearable computer, or another computer subjected to motion forces, present a significant issue with respect to the use of such a computer.

Therefore, it is an objective of the present invention to improve the overall performance characteristics of a computer subjected to motion, such as a wearable computer.

It is a specific objective to address the forces and accelerations on a wearable computer which are due to the motion of the wearer.

It is another objective of the present invention to improve the operation of a disk drive device in a computer, such as a wearable computer.

These objectives and other objectives will be more readily apparent from the further description of the of the invention below.

SUMMARY OF INVENTION

The present invention provides an apparatus, computer, method, and program product for improving the operation of a computer subjected to motion. Specifically, it addresses the control and operation of the motion sensitive disk drive during motion. The invention comprises the monitoring of the motion of the computer, such as the motion due to the motion of the wearer, and the detection of successive forces on the computer caused by the motion. For example, walking motions and jogging or running motions are determined based upon the detection of multiple successive forces by a motion detection device. Based upon the characteristics of the detected forces, a motion condition is determined. That is, a walk condition might be determined, a non-walk condition might be determined, or some other gradation of such motion condition mighty be determined. Based upon the determined motion condition, the operations of a disk drive of the computer are controlled and are scheduled so that the operations significantly avoid occurrence during the occurrence of future of those periodic successive forces.

In accordance with one embodiment of the invention, a motion detection device such as an accelerometer, or the servo control system of the disk drive, is utilized to determine the occurrence and magnitude of a force or acceleration due to the gait and steps of a wearer wearing the computer. Alternatively, the computer might not be wearable, but might be a device which is supported or coupled to a structure which is undergoing periodic motion forces. Therefore, the invention might also be useful for computers which are not meant to be worn, but which are subject to successive forces and periodic motion.

A processor is operably coupled to the motion detection device, such as the accelerometer, and the processor is operable for determining the motion condition based upon the characteristics of the detected forces. By determining the time interval between at least two of the multiple successive forces, the periodicity of the motion is determined. The magnitude of the successive forces is also determined. Based on the periodicity of the motion and the time interval between the forces, and/or the magnitude of the forces, the disk drive operations are scheduled. Generally, the operations of the disk drive will be scheduled to occur in the time interval between the multiple detected forces. In that way, those drive operations do not coincide with future movements of the disk drive caused by the motion of the computer.

In accordance with another aspect of the present invention, selected disk drive operations might be scheduled based upon the particular motion condition which is determined. For a walk condition, only the more motion sensitive operations of the disk drive, such as a write operation, may be scheduled in the time interval between the detected motions. For a non-walk condition, such as a jogging or running condition, all operations, including write operations and read operations, may be scheduled during the time interval between the successive motions.

The present invention therefore significantly eliminates disk drive operations which coincide with motion forces or accelerations which may cause errors in the operation, such as read errors or write inhibit errors, and therefore, enhances the operation of the computer.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF EMBODIMENTS OF THE INVENTION

The invention addresses the needs and objectives in the art, and improves the operation of a computer subjected to motion, by improving the operation of a disk drive associated therewith. The invention controls the operation of the disk drive to ensure that it is not predominantly adversely affected by motion forces encountered due to the motion of the computer. In that way, the performance of the disk drive and the overall computer performance are improved. The disclosed embodiment of the invention is directed to a wearable computer, but the invention has similar applicability to any computer which is subject to periodic motion forces, such as a computer supported on a movable structure.

Figure 1:
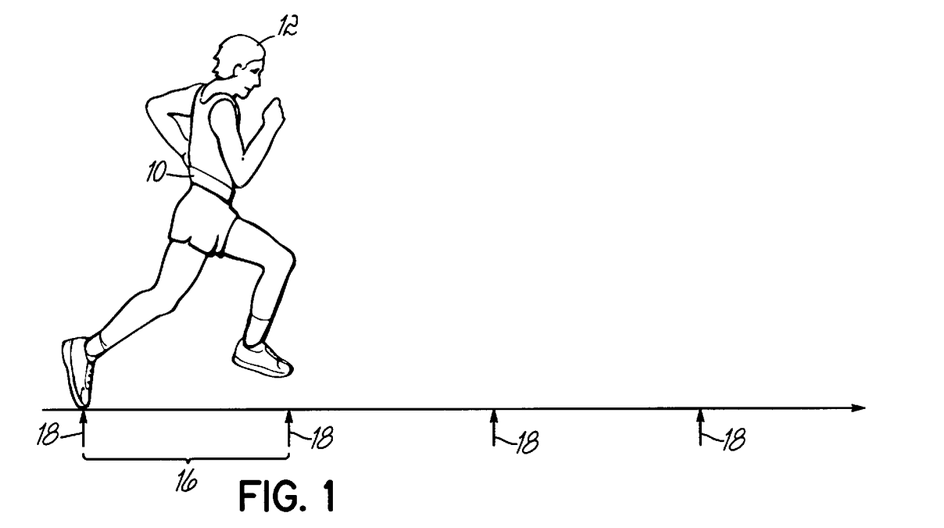
FIG. 1 is a schematic view of a person wearing a computer in accordance with one aspect of the invention.

Referring to FIG. 1, one possible environment for a wearable computer is illustrated, wherein a computer 10 is positioned on a user 12 who is in motion. That motion or locomotion may include walking at a leisurely pace, vigorous running, or motion in between those paces, such as slower distance running or jogging for exercise. The motion might also include motion of a body at rest, but which is subjected to being moved or jolted in a periodic fashion. Therefore, the invention will be applicable to those situations when a person is not walking or running, but is still undergoing periodic forces and accelerations.

The body of a person in motion will typically have a gait associated therewith, and indicated in FIG. 1 by reference numeral 16. The person's gait is a function of many factors, including their height, physical conditions, environmental conditions, the terrain on which they are walking, and other various factors. While some motions of a user 12, which are experienced by the wearable computer 10, may be random, generally the motion or locomotion of a person (i.e. walking, running, etc.) will involve a periodic motion which may be indicated as a certain number of steps per minute or other time interval. The invention takes into account the periodic motion. For example, a person walking at a brisk pace to get to a destination may fall into a periodic motion or gait of approximately 40 steps per minute. A person running or jogging for exercise might fall into a periodic motion of 80 steps per minute. Still further, a more leisurely pace, such as around a home or office may provide a periodic motion of around 20–30 steps per minute. The present invention takes into account the periodic motion of a person wearing the wearable computer, and thus controls the operation of the disk drive of the computer subject to that periodic motion. In that way, read operations and/or write operations are not performed by the disk drive when the successive forces occur.

Referring to FIG. 1, the various steps 18 taken by a person, based upon that person's gait, will produce periodic forces or accelerations on the body 12 which are transferred to the wearable computer 10. That is, the motion of the computer 10 is due to the motion of the user 12, or other movable structure on which the computer is supported. As noted above, such forces and accelerations act upon the disk drive of the wearable computer, such as on the actuator arm which moves the heads of the disk drive, thus causing those drive heads to move off track and thereby impair the operation of the disk drive, including the read operations and write operations of the disk drive. Generally, the read operations and the write operations of the disk drive will be the operations which are significantly affected by motion. However, other disk drive operations may be improved by the invention, as well.

Figure 2:
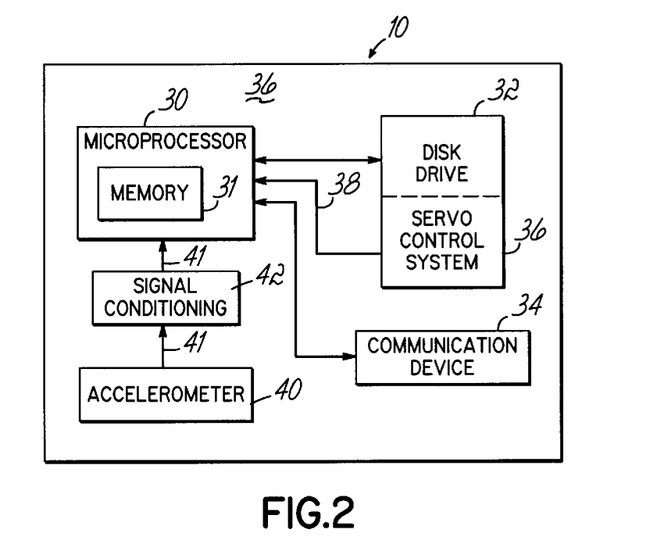
FIG. 2 is a schematic view of a computer in accordance with the principles of the present invention.

FIG. 2 illustrates a schematic diagram of an embodiment of the present invention. The invention provides an apparatus, computer, method, and program product for controlling the operation of a disk drive in a computer which is subjected to motion, such as a wearable computer. The motion of the computer is monitored and multiple successive forces on the computer are detected. Such forces are generally caused by the motion of the user and will often be the periodic forces associated with locomotion. Based upon the characteristics of the detected forces, a motion condition is determined. For example, in one embodiment, a walk condition might be determined, or a non-walk condition, such as a running or jogging condition might be determined. Based upon the motion condition, such as whether the user is walking or running, the operations of the disk drive are scheduled so that those operations significantly avoid occurrence during the future successive forces. For example, read operations and write operations are scheduled so that they do not occur during one of the future motion forces, based upon the motion condition.

In one embodiment, the time interval is determined between the multiple, detected forces to determine the periodicity of the motion. By scheduling the disk drive operations to occur in the time interval between the multiple, periodic forces, those forces are avoided during the disk drive operations. In another aspect of the invention, the magnitude of the successive forces are determined and the scheduling of the operations of the disk drive are also based upon the magnitude of the motion forces. For example, a walking user will generate forces on a computer at longer intervals and smaller magnitude than a running user. Certain operations of the disk drive may be less susceptible to the user's walking motion, or the walk condition, such as a read operation, and therefore may be scheduled randomly, regardless of the walking forces and the interval therebetween. However, more motion sensitive operations, such as write operations would still be scheduled in the interval between the periodic walking forces, even though the user is only walking.

Turning again to FIG. 2, the computer 10, such as a wearable computer, is illustrated in a schematic form to show various components therein in accordance with the principles of the present invention. Computer 10 could be any suitable computer, networked or stand alone. FIG. 2, as discussed herein, shows various components of the computer 10 which are germane to the discussion of embodiments of the invention. However, as will be readily understood by a person of ordinary skill in the art, computer 10 might, and generally will, contain numerous other operational components which are not specifically illustrated. Therefore, the present invention is not limited to a particular type of computer or hardware configuration utilizing only the elements shown and discussed herein.

Computer 10 includes a microprocessor 30 with memory 31, and a disk drive 32, or other similar mass storage device, which is operably coupled to the microprocessor 30. Optionally, the computer 10 may also include some kind of input/output or communication device which may include communication ports, a keyboard, a mouse, and monitor screen, or various other devices which allow a user to communicate with computer 10. Computer 10 operates under the control of an operating system and executes software applications, programs, objects, modules, etc., and may execute software from a program product incorporating the invention or aspects thereof. Therefore, while the invention is described herein in the context of a fully functioning computer system, those skilled in the art will appreciate that an embodiment of the invention is capable of being distributed as software in a program product in various signal-bearing media, including recordable-type media, or transmission-type media, such as digital and analog communications links.

The disk drive 32 will usually include a servo control system 36 which is functional for controlling the movement of the disk drive head and therefore the operation of the disk drive. Associated with the servo control system 36, in accordance with one aspect of the invention, is a position error signal, which is indicated by an arrow and reference numeral 38. In one embodiment of the invention, the position error signal, which indicates the position of a disk drive head over a storage disk track, is utilized to determine a motion condition to which the computer 10 and the disk drive 32 are subjected, as discussed further below. In accor-
dance with another embodiment of the invention, an accelerometer 40 is utilized in combination with a signal conditioning module 42, and is in operable communication with the microprocessor 30.

In accordance with one aspect of the present invention, the accelerometer 40, or servo control system 36, which generates the position error signal, are utilized as motion detection devices which are operable for detecting multiple successive forces on the computer and disk drive caused by the motion of the user, such as walking or running. The microprocessor 30, or another processor, is operably coupled to receive inputs from the accelerometer 40, or to receive, as inputs, the outputs corresponding to the position error signal or another signal from the disk drive 32. In addition to the position error signal, the disk may provide an error signal indicating that a head is more than n% off track, sufficient to cause a write inhibit. The processor, and/or software applications associated therewith, then determines a motion condition based upon the characteristics of the detected forces. The invention, such as through the microprocessor control, is then operable for scheduling operations of the disk drive based upon the motion condition. Microprocessor 30, as understood by those skilled in the art, could also indicate multiple processors.

In one embodiment of the invention, the accelerometer detects the multiple successive forces associated with the footfalls or steps 18 of a person in motion. As noted above, for normal running or walking, such motion will generally be periodic, and will include multiple and successive forces or accelerations based upon the body's movement (e.g., the steps 18). The output from the accelerometer is received by the microprocessor as indicated by the reference numerals and arrows 41. The software application, in accordance with the invention, keeps track of and analyzes the magnitude and periodicity of the motion forces from the accelerometer signals. The accelerometer outputs not only the occurrence of a force, but also the magnitude of the force or acceleration. While an accelerometer 40 is illustrated in FIG. 2, other motion detection devices might also be utilized to provide an output indicating the occurrence of a motion, force, acceleration, and/or the magnitude of such force or acceleration.

Figure 3:
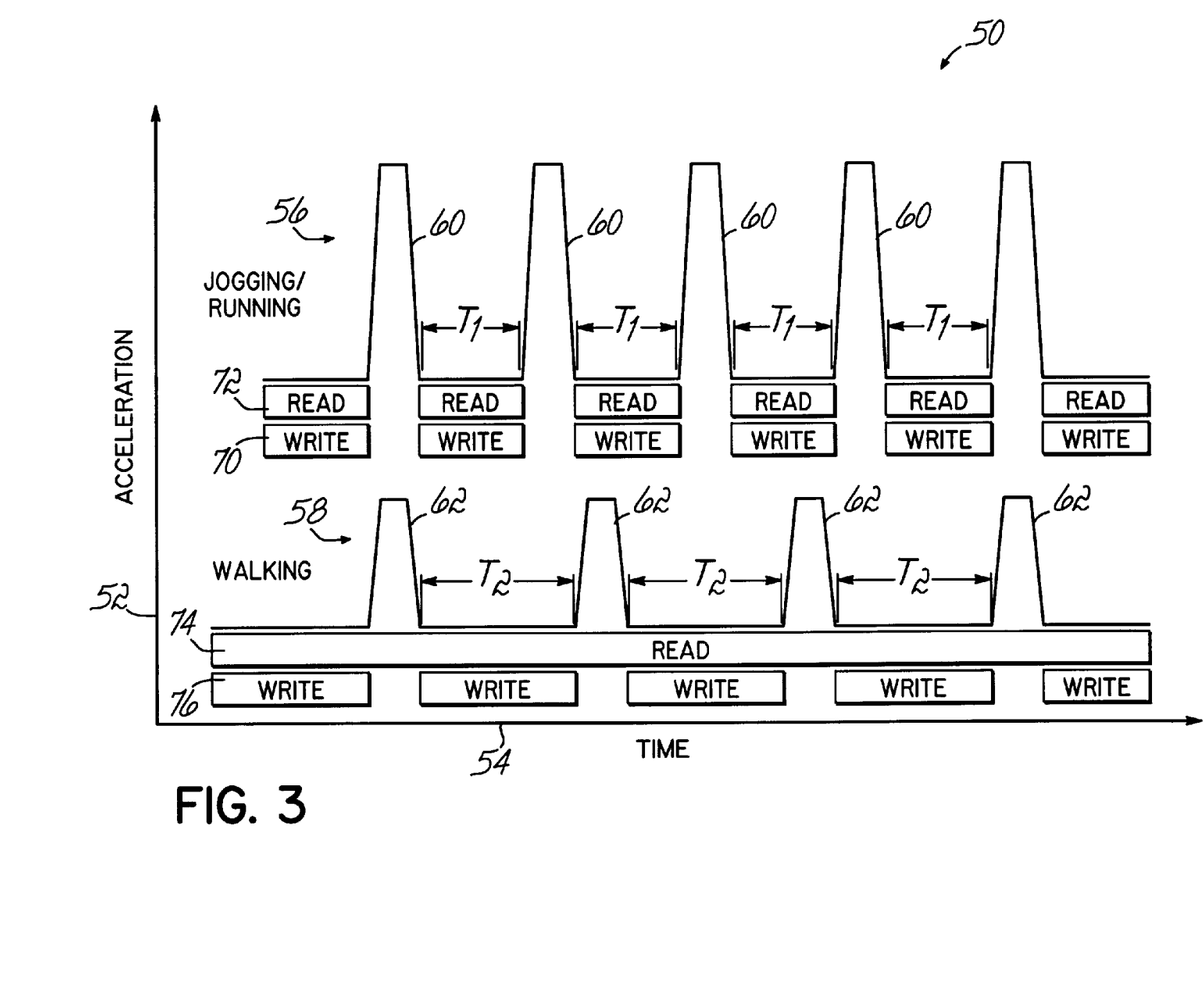
FIG. 3 is a graph of forces detected and scheduled disk drive operations in accordance with the principles of the present invention.

Referring to FIG. 3, graphs are shown for the detected forces in accordance with the principles of the present invention for both a user who is jogging, and also walking. In the graphs, the Y-axis is essentially the acceleration or force magnitude based upon the detected force signal which is input to the microprocessor 30, through an accelerometer or the position signal, for example. The X-axis, on the other hand, is the measurement of time. The jogging/running graph 56, indicates the detection of motion with greater force or acceleration than that associated with the walking graph 58. Furthermore, the time interval between the detection of the successive forces is shorter for graph 56. For example, the peaks 60 of the jogging/running graph 56 indicate greater forces on the body, and thus on the computer and disk drive, due to the jogging or running motion. Furthermore, the time interval $T_1$ between the various force peaks 60 is shorter due to the quicker steps that the body takes during a jogging or running motion, or the greater number of steps within a defined time interval.

As may be appreciated, the various acceleration forces and time intervals of a user's locomotion are approximate or relative, and will not always be exactly equal for each force or between the forces. However, the graphs illustrate the general periodic motion which would be incurred by the body in motion, and the invention addresses such general periodic motion. That is, the periodicity of the motion and force magnitudes are relative and are illustrated in a relative sense to illustrate the invention. As illustrated by walking graph 58, the peaks 62, indicating the magnitude of the force or acceleration, are smaller, and the time interval between such forces $T_2$ is also shorter than $T_1$ due to the fewer number of steps taken while walking, as opposed to jogging or running, within a defined time interval. Based upon the magnitude of those successive forces which are detected, and the periodicity of the forces, or the time interval between at least two of the multiple forces, the invention determines the motion condition, such as a walk condition, a non-walk condition, or some other condition. Scheduling of the operations of the disk drive are based upon the motion condition.

In accordance with another aspect of the present invention, the motion detection device or system utilized to provide an indication of a detected force or acceleration, and the magnitude of such force or acceleration, is based upon the disk drive, such as the servo control system 36 associated with the disk drive 32, and signals associated therewith.

As is known in the art, disk drive 32 utilizes an actuator arm coupled to a head (not shown) which is maintained over the intended track on the disk surface. The arm, in turn, is coupled to a servo motor (not shown) which is controlled by servo control system 36. The servo control system 36 usually utilizes a microprocessor for controlling the motor and arm motion and the head thereon. The operation of the servo control system 36 utilizes a position signal, often referred to as a position error signal (PES), which is a digital signal used by the servo control system to maintain the drive head centered over the intended track on the disk surface. The PES signal is provided by a sensor which is part of the disk drive. The PES signal is utilized within a control loop and provides constant feedback to the servo control system 36 for controlling the location of the head of the disk drive, such as for read and write operations. For example, multiple PES signals might be generated for every revolution of the disk (e.g. every 4 degrees) to determine how far off the head is from the center of the intended track. If the PES signal indicates that the head is slightly off track, the servo control system 36 will operate the servo motor and control the actuator arm and move the head to its proper position.

In accordance with the principles of the present invention, since the PES signal is always present when the disk drive is writing or reading data, the PES signal is used by the microprocessor 30, as indicated by line 38, to detect the existence of an acceleration or force on the computer and disk drive, and the periodicity and magnitude of such motion and associated forces. In one embodiment, the microprocessor 30, or rather the software application controlling the microprocessor, utilizes a threshold for the PES signal wherein each excursion of the PES signal above the threshold would indicate a force or acceleration due to the motion of the user and the computer. Also in accordance with the invention, the time between excursions of the PES signal above the threshold would be measured, such as by microprocessor 30 or a software application executed thereby, to determine the periodicity of the motion. For example, a threshold of a quarter (¼) of a track might be utilized, wherein a timer is started when the PES signal exceeds the threshold.

By determining the intervals between several successive threshold crossings, a pattern or periodicity of the motion is detected. Based upon that periodicity and time interval between the successive forces, the operations of the disk drive are scheduled to significantly avoid occurrence during one or more of the forces or accelerations.

In accordance with another aspect of the invention, the amount which the PES signal exceeds the threshold might also be utilized to determine the magnitude of the successive motion forces or accelerations so that both the magnitude of the forces and the periodicity are used to determine the motion condition. As another alternative, the disk drive provides an error signal indicating that a write inhibit has occurred due to a head being off track by a certain percentage. That error signal might be used as well to determine a time interval and magnitude of the periodic motion.

Microprocessor 30, which is indicative of the main processor or processors of the computer, does not have to be used for practicing the invention, but rather a dedicated processor or a processor associated with the disk drive might also be utilized. Therefore, the term "processor," as used herein, is not limited to microprocessor 30. Also, the invention is not limited to the physical location of the processor utilized to accomplish the invention.

In accordance with another aspect of the present invention, the operations of the disk drive, such as read and write operations, are scheduled based upon the motion condition which is determined. Therefore, the scheduled disk drive operations significantly avoid occurrence during one of said forces. As noted above, the motion, based upon multiple successive forces which are detected, is determined to be periodic in accordance with the principles of the present invention. However, during such periodic motion, there may be non-periodic motion and associated forces, such as due to a temporarily shorter gait, or a more pounding step. Accordingly, the present invention schedules disk drive operations to "significantly" avoid occurrence during one of said forces. However, such operations may sometimes occur during such a motion force, if it is a non-periodic or irregular force. Therefore, the purpose of the present invention is to improve operations of the computer and disk drive by scheduling disk drive operations to significantly avoid such force occurrences; however, this will not always be absolutely the case, even though overall performance is improved.

If a non-walk condition is determined in accordance with the principles of the present invention, disk drive operations, such as a read operation 70 or a write operation 72 may be scheduled, by microprocessor 30, or some other processor, to occur generally in the time interval between the multiple force peaks 60, as illustrated in graph 56 for a jogging/running motion. Disk drive 32 is controlled by the operation of microprocessor 30 or another processor to control the drive's operations as directed by the invention. The significant magnitude of the force or acceleration associated with a running or jogging motion, and illustrated the peaks 60, may be sufficient to interfere with both a write operation as well as a less sensitive read operation. Accordingly, during a non-walk condition, both reading and writing operations might be scheduled generally within the time interval $T_1$ between the multiple detected forces.

For a walking motion, as illustrated by graph 58, the magnitude of force or acceleration illustrated by peaks 62 may not be sufficient to affect the less sensitive read operation, but may affect the more sensitive write operation 76. Accordingly, in accordance with another aspect of the present invention, during a walk condition, indicating walking motion, the reading operation might be random, as would generally be done by the computer without the invention. This might be particularly so if a read error correction was utilized by the computer. However, the more motion sensitive write operation 76 would still be scheduled generally in the time interval $T_2$ between the multiple detected forces 62.

Therefore, both the periodicity of the movement and the magnitude of the forces may be utilized to schedule disk drive operations. The periodicity of the movement will indicate the intervals in which the operations may be scheduled to avoid coinciding with future motion forces. Furthermore, the periodicity may be utilized to determine whether a walk condition or a non-walk condition exists. Similarly, the magnitude of the detected force or acceleration will be used to determine whether a walk condition or a non-walk condition occurs. By utilizing both the periodicity and the magnitude characteristics of the outputs from the motion detecting device, such as an accelerometer or the PES signal from the servo control system, the operation of the computer and the disk drive is enhanced.

For example, one user might have a particularly long gait, and therefore a long interval between detected forces, even when running. However, those detected forces would still have a significant magnitude associated with the person who is running. Therefore, a running condition would be established. A walker having a shorter gait, might actually have the same time interval as another person who is running. However, the magnitude of the forces of the walker would be significantly less than the runner. As such, a walking condition might be established. Accordingly, the present invention utilizes the periodicity of the detected forces, the magnitude of the forces, or both of those factors in determining the specific motion condition which exists, such as a non-walk condition, or a walk condition.

Figure 4A:
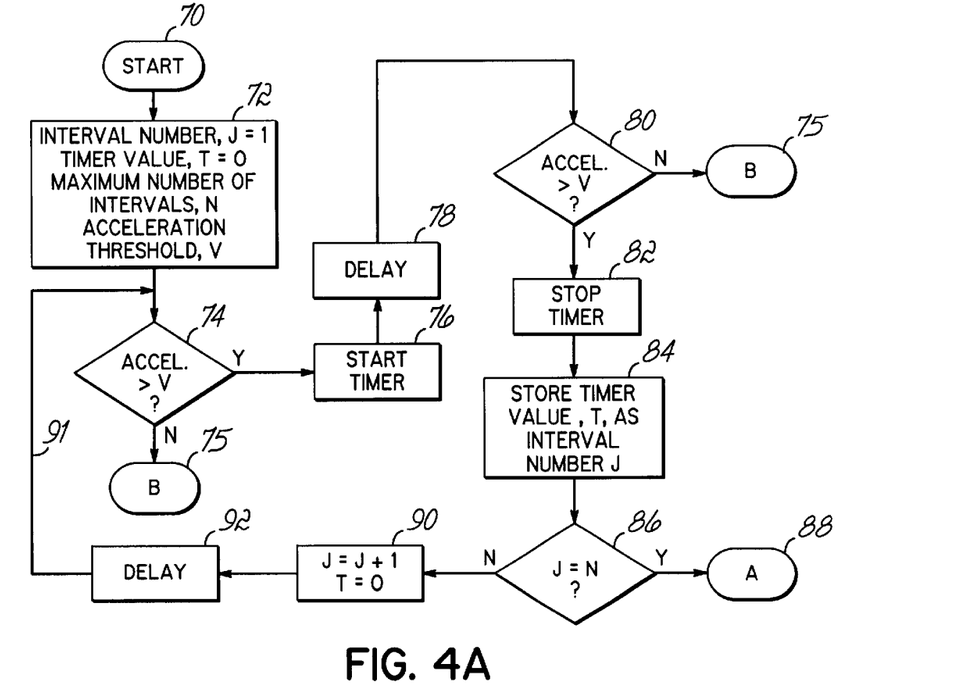
FIGS. 4A and 4B are flow charts for an implementation of one embodiment of the invention.
Figure 4B:
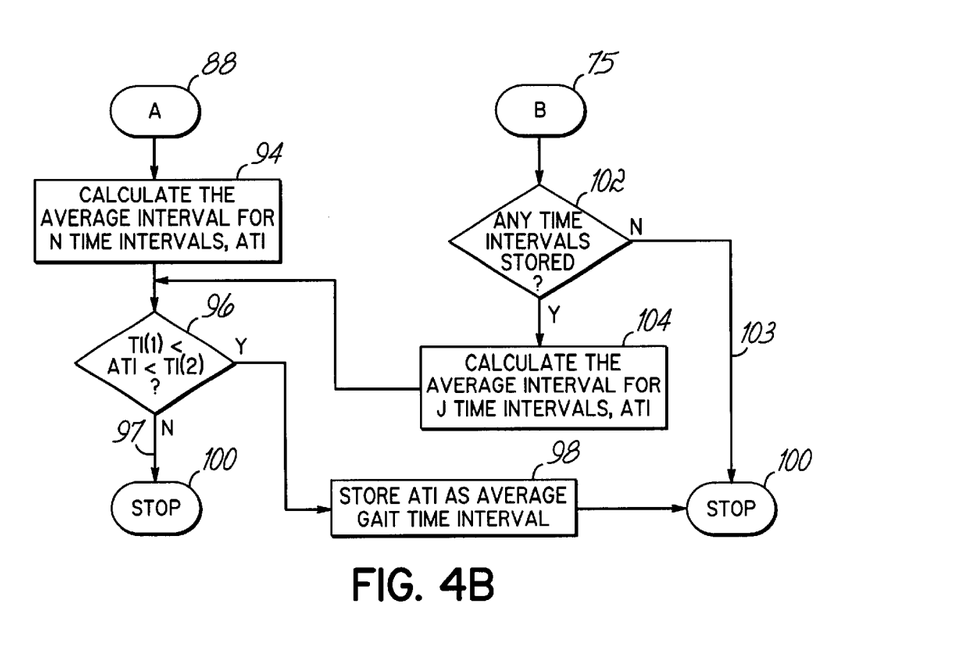
Figure 5:
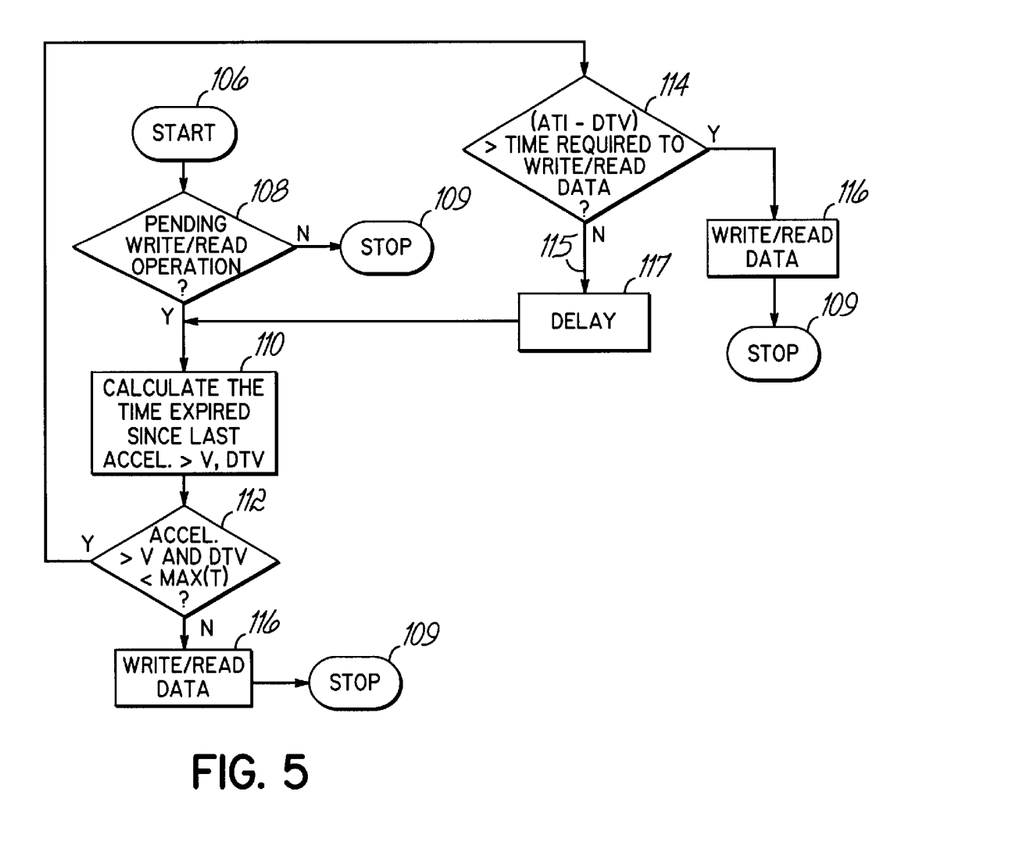
FIG. 5 is a flow chart for an implementation of one embodiment of the invention.

FIGS. 4A, 4B and 5 illustrate flowcharts for one possible embodiment of the invention, and in particular, one possible embodiment of a program for implementing the invention.

FIGS. 4A and 4B illustrate a flow chart for determining the time interval associated with an average running or walking gait, referred to as an average gait time interval.

FIG. 5 illustrates a flow chart associated with a write or read operation according to the principles of the present invention.

Referring to FIG. 4A, one embodiment of a program for determining an estimated time interval between periodic accelerations or forces, starts at Step 70. In Step 72, various initializations are made for values, such as the number of intervals that are to be measured (variable J), the timer value for measuring the time between periodic accelerations (variable T), a maximum number of measured intervals (variable N), and an acceleration threshold (variable V) for determining whether the acceleration should be considered as one which would be used to schedule read and write programs in accordance with the principles of the present invention. When an acceleration is measured, a determination is made as to whether the measured acceleration exceeds the acceleration threshold V which is a minimum acceleration for monitoring the periodic motion. If it does, a timer is started (Step 76). A delay (Step 78) is also introduced so that the next subsequent periodic acceleration will be measured and compared, rather than again immediately checking the acceleration which may still indicate the initial acceleration, not the next subsequent acceleration. That is, the delay takes care of a damping effect which may occur after each acceleration so that the next true subsequent acceleration or force is compared to the threshold rather than comparing the same acceleration twice. After the delay of Step 78, the next measured acceleration is again compared to the acceleration threshold V (Step 80). If the next subsequent measured acceleration exceeds the threshold and is indicative of a periodic movement, such as from a running or walking gait, the timer is stopped (Step 82). The measured timer value T is then stored and is associated with a measured interval number J (Step 84). The program will measure a certain number of time intervals indicated by the maximum interval number N. If the interval number equals the maximum number (Step 86), the average interval will be calculated as noted in the program flow of letter A or Step 88, and FIG. 4B. However, if the interval number J does not equal the maximum N, the interval number is incremented (J=J+1), the timer is reset (T=0) (Step 90), and the acceleration is again compared to a threshold voltage, as indicated by loop 91. A delay, Step 92, will be introduced in order to ensure proper comparison of the measured acceleration with the threshold voltage. The loop as illustrated in FIG. 4A will continue until the number of measured intervals reaches the maximum N. At that point, according to Step 88, as illustrated in FIGS. 4A and 4B, the average interval is determined.

More specifically, referring to FIG. 4B, the average interval for N measured time intervals is calculated (Step 94). The average time interval is indicated by variable ATI. Once the average time interval, or ATI, is calculated, that ATI is compared within a range of TI(1) to TI(2). The range of time intervals, TI, may be determined by a typical time interval for the walking or running gait of a user. If the average time interval falls within a suitable range (Step 96) it is stored (Step 98) and that portion of the program stops. Similarly, if the average time interval is outside a suitable range, as indicated by decision arrow 97. The program, or portion of the program, also stops, as indicated by Step 100. The particular suitable range TI(1)–TI(2) may be custom tuned or set for a particular user with a particular running or walking gait, in accordance with the principles of the present invention.

Returning to FIG. 4A, in response to the decision step 74, if the measured acceleration does not exceed the threshold V, the program progresses to the branch indicated by letter B, or Step 75, as shown in FIGS. 4A and 4B. In such a case, the program checks to see if any time intervals have been measured and stored (Step 102). If any time intervals have been stored, the average interval for the number of those stored time intervals, indicated by ATI, is calculated (Step 104). The program then proceeds to Step 96 and concludes, as noted above, with respect to the average time interval ATI. If no time intervals are stored, and the acceleration has not exceeded the threshold V, the program stops, as indicated by decision arrow 103. The path indicated by letter B or numeral 75 is also followed if an initial acceleration exceeds the threshold V, as indicated by Step 74, but then a subsequently measured acceleration does not exceed the threshold V, as illustrated in Step 80. Once the program from FIGS. 4A and 4B is concluded or stopped, a time interval or an average time interval ATI has been determined for the motion.

In accordance with the invention, the detected motion condition is used to schedule disk drive operations. Turning now to FIG. 5, the program starts with Block 106. A determination is made as to whether a read or write operation is pending (Step 108). If it is not, the program stops, as indicated by Step 109. If a read or write operation is pending, the time that has expired since the last measured acceleration is calculated as DTV (Step 110). If the acceleration exceeds the threshold V and the time expired since the last measured acceleration DTV is less than a maximum time interval MAX(T) (Step 112), a determination is made as to whether the remaining time before the next subsequent acceleration force is sufficient for reading or writing the data (Step 114). Referring to Step 112, the maximum time interval (MAX(T)) is utilized to ensure that the invention does not wait too long to read or write. If the acceleration has not occurred within the maximum interval, then the system will read or write the data, as indicated by Step 114. The program will then stop (Step 109). As discussed herein, the most motion critical operation will generally be a write operation, although the invention is suitable for scheduling both read and write operations, as noted above. With the read operation, there is no critical time frame for reading, in which data might be lost. However, for a write operation, it will be desirable to write the data as soon as possible so that there is less risk that the data will be lost.

Returning to Step 114, if the difference between the time which has expired since the last measured acceleration DTV and the average time interval ATI, is greater than the time which is required to write or read the data, the data is written or read according to Step 116, and the program stops (Step 109). If there is not enough time to write or read the data, as indicated by decision arrow 115, a delay is introduced (Step 117), and the time which has expired since the last measured acceleration is again calculated (Step 110) and the program proceeds as shown in FIG. 5.

The implementation illustrated in FIGS. 4A, 4B and 5 is one exemplary set of flow charts for an embodiment of the present invention and is not limiting. Other implementations might be utilized to achieve the principles and aspects of the present invention as described in the claims herein.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method of controlling the operation of a disk drive in a computer subjected to motion, the method comprising:
   monitoring the motion of the computer and detecting multiple successive forces on the computer caused by the motion;
   based upon timing characteristics of the detected multiple successive forces, determining a periodic motion condition; and
   scheduling operations of the disk drive based on the periodic motion condition so that the scheduled disk drive operations significantly avoid occurrence during occurrence of future successive forces.

2. The method of claim 1 further comprising:
   determining the time interval between at least two of the multiple forces to determine the periodicity of the motion; and
   scheduling operations of the disk drive based upon the time interval.

3. The method of claim 2 wherein said scheduling step includes scheduling operations of the disk to occur generally in the time interval between the multiple forces.

4. The method of claim 1 further comprising:
   determining the magnitude of the successive forces on the computer; and
   scheduling operations of the disk drive based on the magnitude of the motion forces.

5. The method of claim 1 wherein said scheduled operations of the disk drive include one of read and write operations.

6. The method of claim 1 wherein the computer is worn by a user and the motion of the computer is due to the motion of the user, the method further comprising:
   detecting multiple successive forces on the computer associated with multiple steps taken by a user in motion.

7. The method of claim 6 further comprising:
   determining at least one of a walk condition and a non-walk condition for the motion based upon the forces from the steps taken by a user; and
   scheduling operations of the disk drive based upon the at least one walk and non-walk conditions of the motion.

8. The method of claim 7 further comprising determining the at least one of a walk condition and a non-walk condition for the motion based upon the time interval between the multiple steps taken by the user.

9. The method of claim 7 further comprising determining the at least one of a walk condition and a non-walk condition for the motion based upon the magnitude of the successive forces on the computer from the user's steps.

10. The method of claim 7 wherein said scheduled operations of the disk drive include read and write operations, the method further comprising:
    scheduling write operations during a walk condition.

11. The method of claim 7 wherein said scheduled operations of the disk drive include read and write operations, the method further comprising:
    scheduling read and write operations during a non-walk condition.

12. The method of claim 1 further comprising using an accelerometer with the computer to detect the forces caused by the motion.

13. The method of claim 1 wherein the disk drive generates a position signal for a disk drive head, the method further comprising monitoring the position signal to determine the forces caused by the motion and determining the motion condition based on the position signal.

14. A computer comprising:
    a disk drive capable of performing read and write operations;
    a motion detection device operable for detecting multiple successive forces, to which the disk drive is subjected, caused by motion of the computer;
    a processor operably coupled to said motion detection device, the processor operable for determining a periodic motion condition based upon timing characteristics of the detected multiple successful forces, and further operable for scheduling operations of the disk drive based on the periodic motion condition so that the scheduled disk drive operations significantly avoid occurrence during occurrence of future successive forces.

15. The computer of claim 14 wherein the processor is operable for determining a time interval between at least two of the multiple forces to establish a periodicity of the motion and for scheduling operations of the disk drive based upon the time interval.

16. The computer of claim 15 wherein the processor is operable for scheduling operations of the disk drive to occur generally in the time interval between to multiple forces.

17. The computer of claim 14 wherein the processor is operable for determining the magnitude of the successive forces on the computer and scheduling operations of the disk drive based on the magnitude of the motion forces.

18. The computer of claim 14 wherein the computer is worn by a user and the motion of the computer is due to motion of the user, the processor being operable for determining at least one of a walk condition and a non-walk condition for the motion based upon the forces from multiple steps taken by a user, and for scheduling operations of the disk drive based upon the at least one walk and non-walk conditions of the motion.

19. The computer of claim 18 wherein the processor is operable for determining the at least one of a walk condition and a non-walk condition for the motion based upon a determined time interval between the multiple steps taken by the user.

20. The computer of claim 18 wherein the processor is operable for determining the at least one of a walk condition and a non-walk condition for the motion based upon a determined magnitude of successive forces on the computer from the user's steps.

21. The computer of claim 18 wherein the processor is operable for scheduling read and write operations during a non-walk condition.

22. The computer of claim 18 wherein the processor is operable for scheduling write operations during a walk condition.

23. The computer of claim 14 wherein said motion detection device includes an accelerometer to detect the forces caused by the motion.

24. The computer of claim 14 wherein the motion detection device generates a position signal for a disk drive head of the disk drive, the processor operable for determining a motion condition based on the position signal.

25. An apparatus for controlling the operation of a disk drive in a computer the apparatus comprising:
a motion detection device operable for detecting multiple successive forces, to which the disk drive is subjected, caused by motion of the computer;
a processor operably coupled to said motion detection device, the processor operable for determining a periodic motion condition based upon timing characteristics of the detected multiple successive forces, and further operable for scheduling operations of the disk drive based on the periodic motion condition so that the scheduled disk drive operations significantly avoid occurrence during occurrence of future successive forces.

26. The apparatus of claim 25 wherein the processor is operable for determining a time interval between at least two of the multiple forces to establish a periodicity of the motion and for scheduling operations of the disk drive based upon the time interval.

27. The apparatus of claim 26 wherein the processor is operable for scheduling operations of the disk drive to occur generally in the time interval between the multiple forces.

28. The apparatus of claim 25 wherein the processor is operable for determining the magnitude of the successive forces on the computer and scheduling operations of the disk drive based on the magnitude of the motion forces.

29. The apparatus of claim 25 wherein the computer is worn by a user and the motion of the computer is due to motion of the user, the processor being operable for determining at least one of a walk condition and a non-walk condition for the motion based upon the forces from multiple steps taken by a user, and for scheduling operations of the disk drive based upon the at least one walk and non-walk conditions of the motion.

30. The apparatus of claim 29 wherein the processor is operable for scheduling read and write operations during a non-walk condition.

31. The apparatus of claim 29 wherein the processor is operable for scheduling write operations during a walk condition.

32. The apparatus of claim 25 wherein said motion detection device includes an accelerometer to detect the forces caused by the motion.

33. The apparatus of claim 25 wherein the motion detection device generates a position signal for a disk drive head of the disk drive, the processor operable for determining a motion condition based on the position signal.

34. A program product for controlling the operation of a disk drive in a computer subjected to motion, the program product comprising:
a program configured to receive inputs related to the detection of multiple successive forces on the computer caused by the motion, and to determine a periodic motion condition based upon the multiple successive force inputs, the program further configured to schedule operations of the disk drive based on the periodic motion condition so that the scheduled disk drive operations significantly avoid occurrence during occurrence of future successive forces;
a signal bearing media bearing the program.

35. The program product of claim 34 wherein the program is further configured to detect the time interval between at least two of the multiple forces to determine the periodicity of the motion and to schedule operations of the disk drive based upon the time interval.

36. The program product of claim 35 wherein the program is further configured for scheduling operations of the disk drive to occur generally in the time interval between the multiple forces.

37. The program product of claim 34 wherein the program is further configured to detect the magnitude of the successive forces on the computer and to schedule operations of the disk drive based on the magnitude of the motion forces.

38. The program product of claim 34 wherein the program is further configured to schedule one of read and write operations.

39. The program product of claim 34 wherein the computer is worn by a user and the motion of the computer is due to motion of the user, the program further being configured for determining at least one of a walk condition and a non-walk condition for the motion based upon forces from steps taken by the user and configured for scheduling operations of the disk drive based upon the at least one walk and non-walk conditions of the motion.

40. The program product of claim 39 wherein the program is further configured for determining the at least one of a walk condition and a non-walk condition for the motion based upon a time interval between multiple steps taken by the user wearing the computer.

41. The program product of claim 39 wherein the program is further configured for determining the at least one of a walk condition and a non-walk condition for the motion based upon a magnitude of the successive forces on the computer from the user's steps.

42. The program product of claim 39 wherein said scheduled operations of the disk drive include read and write operations, the program being further configured for scheduling write operations during a walk condition.

43. The program product of claim 39 wherein said scheduled operations of the disk drive include read and write operations, the program being further configured for scheduling read and write operations during a non-walk condition.

44. The program product of claim 34 wherein the program is further configured to receive an output from an accelerometer operably coupled to detect motion forces on the computer and to determine a motion condition based on the accelerometer output.

45. The program product of claim 34 wherein the program is further configured to receive a position signal for a disk drive head of the disk drive and to determine the motion condition based on the position signal.

46. The program product of claim 34 wherein the signal bearing media comprises at least one of a recordable media and a transmission media.

* * * * *